United States Patent [19]
Sugiura et al.

[11] Patent Number: 4,894,669
[45] Date of Patent: Jan. 16, 1990

[54] LASER BEAM PRINTER

[75] Inventors: Yoshinori Sugiura, Kawasaki; Akihiko Takeuchi, Yokohama, both of Japan

[73] Assignee: Canon Kabushiki Kaisha, Tokyo, Japan

[21] Appl. No.: 339,695

[22] Filed: Apr. 18, 1989

[30] Foreign Application Priority Data

Apr. 20, 1988 [JP] Japan ................................. 63-097533

[51] Int. Cl.⁴ ............................................. G01D 15/00
[52] U.S. Cl. .................................... 346/160; 346/154
[58] Field of Search .................. 346/160, 154, 107 R, 346/108; 358/300, 302; 355/233–235; 364/518, 519; 400/114

[56] References Cited

U.S. PATENT DOCUMENTS

4,768,043  8/1988  Saito et al. ........................ 346/160
4,769,659  9/1988  Umeda et al. ...................... 346/160

Primary Examiner—Arthur G. Evans
Attorney, Agent, or Firm—Fitzpatrick, Cella, Harper & Scinto

[57] ABSTRACT

A laser beam printer includes laser beam generator for producing a laser beam modulated in accordance with image information, deflector for deflecting the laser beam produced by the laser beam generator to effect a scanning operation, the deflector is rotatable to deflect the laser beam, a rotatable photosensitive member for being exposed to the laser beam deflected by the deflector, controller for controlling the deflector and for controlling rotation of the photosensitive member, and wherein upon printing signal, the controller causes the deflector to start its rotation, and thereafter, causes the photosensitive member to start its rotation.

24 Claims, 5 Drawing Sheets

LASER BEAM PRINTER

FIELD OF THE INVENTION AND RELATED ART

The present invention relates to a laser beam printer wherein a light beam is deflected by rotation of a rotatable mirror or hologram.

Recently, a light beam printer becomes widely used wherein a photosensitive member is scanned with a light beam such as a laser beam modulated in accordance with an electric signal to form a desired image on the photosensitive member. In the laser beam printer among the light beam printers, it is most ordinary to deflect the laser beam by rotation using a rotatable mirror such as a rotatable polygonal mirror and a galvano mirror, or hologram.

In a laser beam printer wherein the laser beam is deflected by a high speed rotation, the deflector is kept rotating as long as the main switch is closed.

This, however, causes problems of noise and shorter service life due to wearing of the bearing. In order to solve the problems, U.S. Pat. No. 4,647,946 has proposed that the rotation of the photosensitive member is started simultaneously with the start of the deflector rotation, and the photosensitive member is pre-processed during the rising (start-up) period of the deflector rotation up to a predetermined speed.

The pre-process will be described. A photosensitive member has different sensitivities depending on its rest period. In consideration of this, it is usual that prior to the image forming operation, the photosensitive member is rotated, during which a pre-exposure lamp or a primary charger are operated to stabilize the sensitivity of the photosensitive member. This is the pre-process. The rotation of the photosensitive member during the pr-eprocess period will be called hereinafter "pre-rotation".

The pre-rotation is continued at least one full turn so as to stabilize the sensitivity all over the photosensitive member surface.

An example of the laser beam printer wherein the deflector and the photosensitive member are simultaneously started, will be described. Where the printer has a dot density (resolution of the recording) of 300 DPI, a printing speed of 8 sheets/minute, using a rotatable hexagonal mirror, the rotational speed of the mirror during the beam deflection is approximately 566 RPM, and the process speed (peripheral speed of the surface of the photosensitive member) is $15\pi$ mm/sec ($\pi$ is the ratio of the circumference of a circle to its diameter). The rising period reaching the 5566 RPM rotation of the driving motor for the polygonal mirror is 3-4 sec, and the operational sequence is such that the driving motor is started simultaneously with the start of the pre-rotation of the photosensitive drum after the printing signal is produced. The pre-rotation is performed for two full rotations in consideration of the service life of the photosensitive member, more particularly, 4 sec. Therefore, it is possible that the polygonal mirror motor reaches the predetermined speed during the pre-rotation of the photosensitive drum and substantially simultaneously with completion of the pre-rotation, and then, it is servo-locked to perform a constant speed rotation.

However, if an attempt is made to further increase the recording speed, for example, to double the printing speed, it is required that the rotational speed of the driving motor is also doubled, that is, 11,132, RPM or the number of the polygonal mirror surfaces is doubled. Usually, doubling the mirror surface numbers results in narrower scanning angle (view), and in order to compensate it, the focal length of the imaging lens system has to be made longer with the result of a large size scanning optical system, and therefore, a bulkiness of the apparatus. Accordingly, it is advantageous to double the rotational speed of the driving motor, but this requires a longer start-up period, for example, 6-8 sec which is approximately a two-fold period. The process speed at this time is $30\pi$ mm/sec which is twice the speed. When the diameter of the photosensitive drum is 30 mm, the drum rotates through one full-rotation per sec. If the photosensitive drum rotates through two full-rotations in the pre-rotation, and if the pre-rotation of the photosensitive drum and the rotation of the driving motor are simultaneously started upon print starting signal, the photosensitive drum rotates through 6-8 rotations until the driving motor is servo locked.

Usually, one full-turn is sufficient for the pre-rotation, and longer pre-rotation than necessary would lead deterioration of sensitivity of the photosensitive member. Where a cleaning blade contacted to the photosensitive member is employed in order to clean the photosensitive member for repeated use thereof, longer pre-rotation promotes the wearing or scraping of the photosensitive member.

In an attempt to avoid those problems, it would be possible to greatly reduce the start-up period of the driving motor, but it would result in a larger current consumption, and therefore, in heat generation and increase of the noise and vibration.

SUMMARY OF THE INVENTION

Accordingly, it is a principal object of the present invention to provide a laser beam printer wherein the photosensitive member is not wastefully pre-rotated even if the rotational speed of a light deflecting means is high.

It is another object of the present invention to provide a laser beam printer wherein a sufficient amount of pre-rotation of the photosensitive member is possible even when the start-up period of the deflecting means vary.

It is a further object of the present invention to provide a laser beam printer wherein the rotation of the photosensitive member can be started after start of the rotation of the deflecting means.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
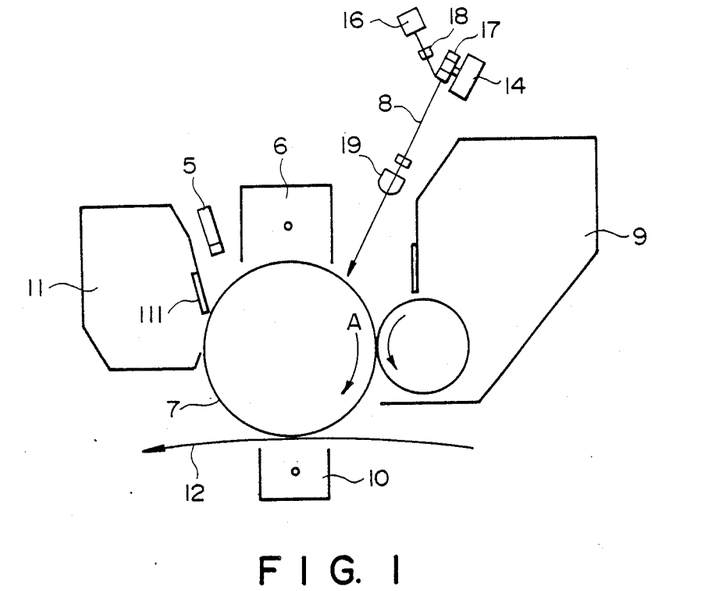
FIG. 1 is a sectional view of a laser beam printer according to an embodiment of the present invention.

Referring to FIG. 1, there is shown a laser beam printer according to an embodiment of the present invention. The laser beam printer comprises a photosensitive drum 7 having an OPC (organic photoconductor) photosensitive layer movable along an endless path in a direction indicated by an arrow A. The photosensitive drum 7 is uniformly charged to a negative potential by a primary charger 6 and is exposed to a laser beam 8, so that an electrostatic latent image is formed thereon.

The laser beam 8 is emitted from a laser unit including a semiconductor laser and a collimator lens in the form of a beam modulated in accordance with an electric signal. The laser beam is deflected by the rotational polygonal mirror 17 to scan the photosensitive drum 7. The laser beam printer further comprises a driving motor unit 18 including a motor 14 for driving the polygonal mirror 17 and lens groups 18 and 19 for correcting tilt of the polygonal mirror and imaging lenses.

The latent image formed on the photosensitive drum 7 is reverse-developed by a developing device 9. The developed image is transferred onto a recording material 12 by a transfer charger 10.

After the image transfer, the photosensitive drum is cleaned by a cleaning device 11 comprising a rubber blade 111 contacted to the surface of the photosensitive drum 7 so that the residual developer is removed. Thereafter, the residual electric charge is removed by a pre-exposure lamp 5 so as to be prepared for repeated use.

Figure 2:
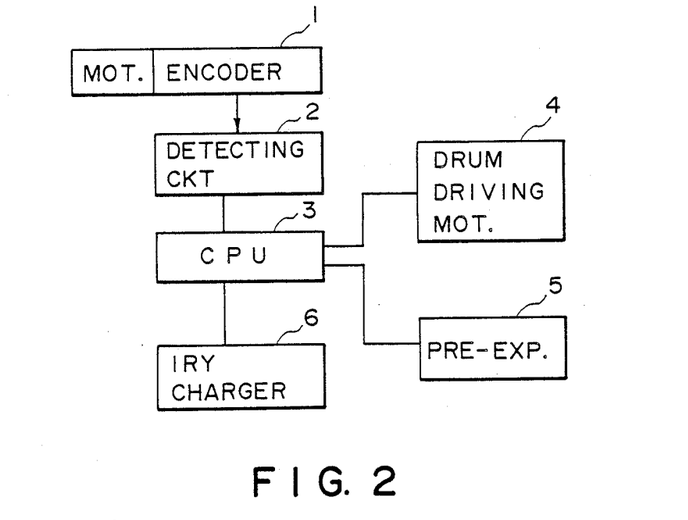
FIG. 2 is a block diagram illustrating an embodiment of the present invention.

FIG. 2 is a block diagram further explaining the embodiment of the present invention.

As shown in this Figure, there are provided an encoder 1 contained in the driving motor unit 18 and for producing a frequency signal in accordance with the rotational speed of the driving motor, a detection circuit 2 for receiving a signal from the encoder to detect that the rotational speed of the driving motor reaches a predetermined level which is lower than the rotational speed during the laser beam deflecting operation, and a CPU (central processing unit) 3 for monitoring an output signal from the detection circuit. When the rotational speed of the driving motor reaches the predetermined level, a signal is produced from the detecting circuit 2, in response to which the CPU 3 instructs start of the pre-rotation of the photosensitive member 7 in the pre-process step, the driving motor 4 for the photosensitive drum first starts to rotate, and simultaneously, a pre-exposure lamp 5 is turned on. Then, after a photosensitive drum start-up period $t_1$, that is, after the rotation of the photosensitive drum 7 is stabilized, a primary charger 6 is actuated, and when that part of the photosensitive drum surface which has been faced to the primary charger 6 while the primary charger 6 is in operation, reaches the position of the transfer charger 10 ($t_2$), the transfer charger 10 is actuated. The pre-rotation step terminates upon substantially two rotations of the photosensitive drum 7 ($t_3$ sec) completed. Subsequently, the image formation step starts.

The organic photoconductor, particularly, has such a property that a charge hysteresis easily remains when it is positively charged, that is, the opposite polarity to the primary charging. The hysteresis is not easily removed by light application. Therefore, it is preferable that the region of the photosensitive member which is subjected to the positive transfer charge has been subjected to the primary charge before that.

Figure 3:
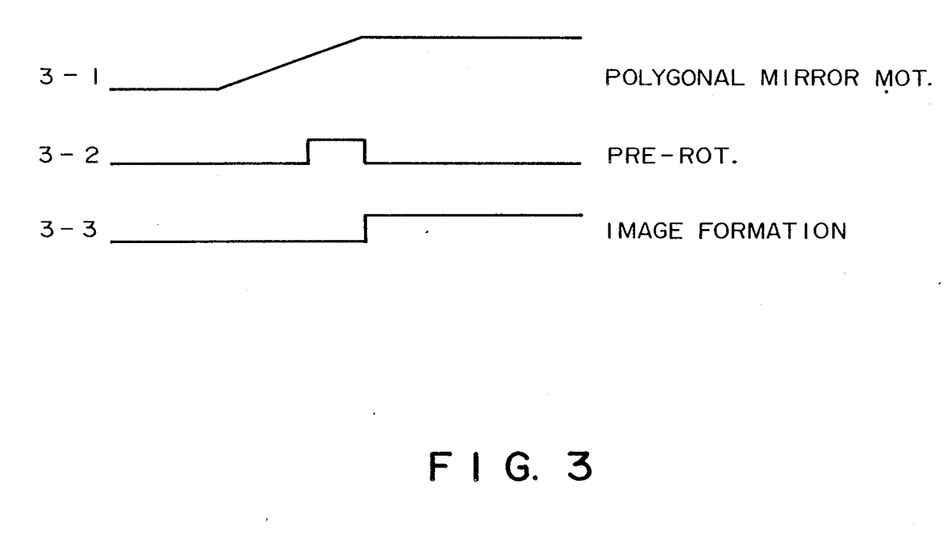
FIGS. 3 and 4 are timing charts in an apparatus according to an embodiment of the present invention.

FIG. 3 is a timing chart when the process speed is $30\pi$ mm/sec, and the diameter of the photosensitive drum is 30 mm. The photosensitive drum rotates at a rate of one full-turn per sec.

Reference numeral 3-1 designates a rising (start-up) property of the driving motor for the polygonal mirror, wherein the time period required from the rest state to the servo-locked state at which the rotational speed is stabilized to 11,132 RPM, is 8 sec, and the rotational speed of the motor at the time of 2 sec prior to the servo-locking is approximately 7132 RPM. At this predetermined speed which is lower than the stabilized rotational speed during the deflecting operation is reached, the pre-rotation start signal for the photosensitive drum is produced, by which the photosensitive drum does not rotate wastefully, and the recording of the image signal can be started most quickly. Reference numeral 3-2 designates timing of the pre-rotation, and as will be understood from this, the pre-rotation terminates simultaneously with the servo-locking of the polygonal mirror motor. The servo-locking may be effected during the pre-rotation, it may be simultaneously with termination of the pre-rotation, preferably, slightly prior to the termination of the pre-rotation with the advantage of reduced time consumption. Reference numeral 3-3 designates image forming process start timing.

Figure 4:
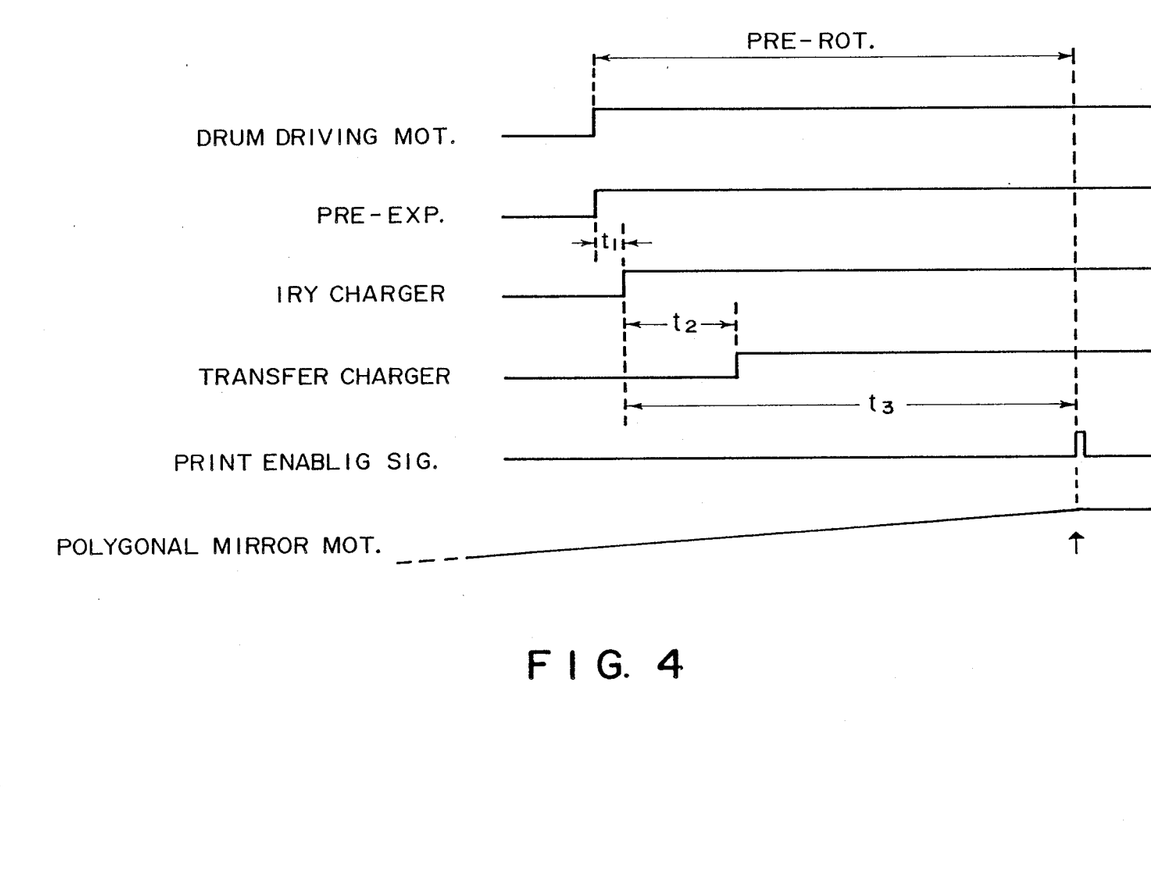

FIG. 4 is a timing chart during the pre-rotation described hereinbefore.

Experiments have shown that an acceleration speed at the time of the start-up of the driving motor for the polygonal mirror is 200 RPM/sec$^2$.

The acceleration is dependent upon power and moment of inertia of the motor, and if the conditions of the motor is determined, the acceleration does not vary very much and shows good reproducibility. For example, in a printer wherein the rotational speed of the polygonal mirror is selectable by which it can be matched with various dot densities without change of the main part of the printer, or in a printer having selectable dot densities, the rotational speeds are selectable from 8904 RPM, 11,132 RPM and 14,842, RPM corresponding to 240 DPI, 300 DPI and 400 DPI, respectively. The acceleration at the time of the motor start-up is constant if the driving current is constant. Therefore, the rotational speed increases by 4000 RPM during the pre-rotation which is two turns in 2 sec. The rotational speeds of the mirror driving motor at the time of the start of the drum pre-rotation are made selectable, correspondingly to the dot densities selected, for example, not less than 4904 RPM for 240 DPI, not less than 7132 RPM for 300 DPI and not less than 10,842 RPM for 400 DIP.

The time period from the start of the photosensitive drum rotation to the servo-locking (the rotational speed has reached the predetermined rotational speed required for the light deflecting operation, slightly varies depending on individual printers, and therefore, it is preferable that the time period is longer than the period required for one-full turn of the photosensitive member.

After the recording of the image signal is completed, the power supply to the mirror motor is shut-off. Then, after the image transfer, the transfer charger 10 terminates its operation, and subsequently, a post-rotation step is performed substantially in a reversed order from the pre-processing operation. The photosensitive drum continues to rotate until the sheet is discharged from the printer. Since the driving motor continues to rotate by inertia for 30–40 sec after stoppage of power supply to the driving motor, it continued to rotate after stoppage of the photosensitive drum after the last sheet is discharged from the printer. If the printing operation is resumed with this state, the driving motor for the polygonal mirror is energized again to start acceleration. The acceleration is 2000 RPM/sec which is the same as in the start from 0 RPM. If the motor is actuated while the motor is rotating at 3000 RPM, for example, the acceleration starts from the 3000 RPM, and after 1 sec, the rotational speed reaches 5000 RPM. The rotational speed of the mirror motor at which the pre-rotation of the photosensitive drum 7 starts is different for a different dot density but is predetermined.

For the same reasons as described hereinbefore, it is preferable that the portion of the photosensitive member, particularly the organic photosensitive member has already been subjected to the primary charging before it is subjected to the transfer charging, also in the post-rotation.

Figure 5:
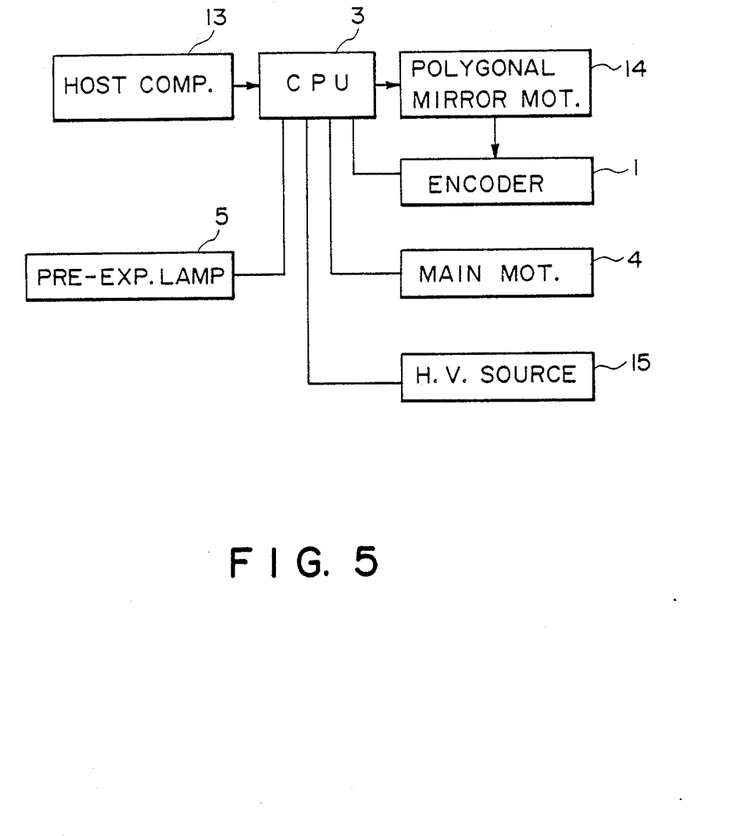
FIG. 5 is a block diagram illustrating control in accordance with an embodiment.

FIG. 5 is a block diagram of a control circuit, wherein the control circuit includes the CPU 3 for controlling the printer. The CPU 3 is provided with input ports for receiving data of the images and the dot density from a host computer 13. The polygonal mirror motor 14 has a built-in encoder 1 which produces a pulse signal indicative of a frequently which is proportional to the rotational speed of the polygonal mirror motor, to the CPU 3.

To the CPU 3, a main motor 4 for driving the photosensitive drum, the image fixing device and a sheet conveying system, a high voltage source 15 for supplying power to the transfer charger and the primary charger and a pre-exposure lamp 5 are connected. The CPU 3 has a non-volatile memory which stores data of the rotational speeds of the mirror motor for the respective dot densities, at which the pre-rotation starts.

The stored rotational speeds are those described hereinbefore. For example, for 300 DIP, the datum of 7132 RPM is stored. And, the respective dot densities and the respective rotational speeds are stored in the memory of the CPU in the form of a reference table.

The description will be made as to the operation of the printer, upon production of the print start signal, the polygonal motor 12 is energized to start rotation. Simultaneously, a pulse signal proportional to the rotational speed is produced from the encoder 1, and is transmitted to the CPU 3. The CPU 3 counts the pulse signal, and reads the data corresponding to the dot density data transmitted from the host computer, from the reference table stored in the memory of the CPU 3. It is compared with the count of the pulse signal from the encoder, and the counting and comparing operations are repeated until the count is equal to or beyond the read data. Then, the start instruction signal for the pre-rotation operation is produced if the above condition is satisfied. In response to the instructions, the pre-rotation operation is started and performed in accordance with memorized sequential steps. Thus, the pre-rotation step operation without waste is possible.

Another embodiment of the present invention will be described which is suitable when the rising property of the driving motor varies or when the rising property is different for individual machines. It has been confirmed that a DC motor used for driving in one direction a laser beam deflector, such as the rotational mirror driving motor, increases its rotational speed with a constant acceleration from the start to the servo-locking. The CPU 3 counts the number of pulses P2 from the encoder 1 between 1 sec after the actuation of the driving motor and 2 sec after that, and the acceleration A during that period is determined on the basis of the difference in the counted pulse numbers. Since the target rotational speed of the mirror driving motor is known from the data of the host computer 13, it is possible to calculate the time period $t_1$ from the start of the mirror motor to the servo-locking on the basis of the acceleration A. The pre-rotation is started after $t_1 - t_2$ ($t_2$ is the period of the pre-rotation) has passed after the start of the driving motor. The rotational speed at this time which is expressed as A (T1−T2) is calculated, and when the number of pulses produced from the encoder 1 indicates this rotational speed, the pre-rotation step is started.

Such a calculation is not necessarily performed for each time. For example, it may be stored in a memory at the time of the initial printing after the main switches closed, and the stored memory may be read whenever the pre-rotation is required.

As a further embodiment, it is possible the pre-rotation step operation is started after a predetermined period has passed from the start of the operation, in place of counting the pulse number from the encoder. Usually, the mirror driving motor is designed such that it does not involve load variation. This is required as one of the conditions for preventing non-uniform rotation of the driving motor which is one of fatal defects for a driving motor. Therefore, the start-up property of the mirror driving motor is significantly stabilized, and the time variation from the start to the servo-locking for various machines is within ±1 sec.

Figure 6:
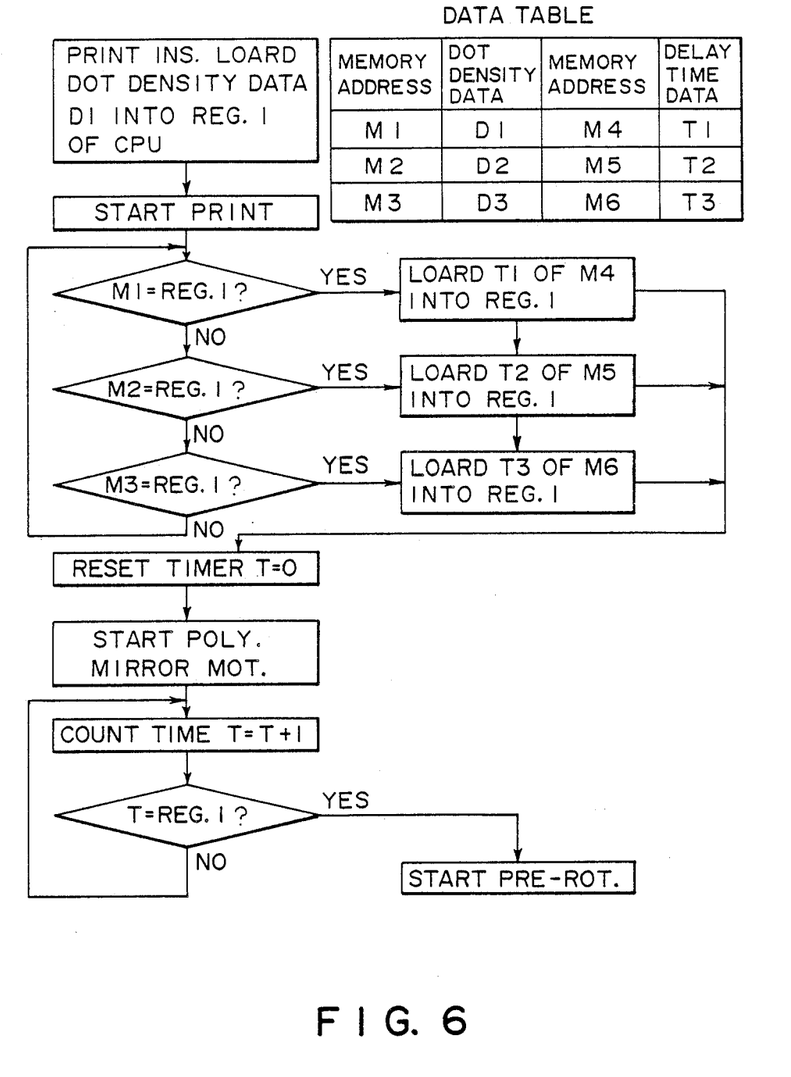
FIG. 6 is a flow chart illustrating an operation of the apparatus according to a further embodiment of the present invention.

FIG. 6 shows a further embodiment wherein the start timing of the pre-rotation is controlled on the basis of the time described above. The CPU 3 has a memory of delay periods corresponding to the dot densities of the image signals, in the form of a data table. For example of the delay period data, the pre-rotation operation is started with a delay of 2 sec from the mirror motor start, for 240 DPI. Similarly, it is 3 sec for 300 DPI; and 4 sec for 400 DPI. The delay period data have been determined by subtracting the time required for the pre-rotation process from the start-up period for each of the rotational speeds corresponding to the dot densities. Substantially simultaneously with production of the print start signal from the host computer 13, the data of the dot density is transmitted to the CPU 3, which loads into a register the delay period data corresponding to the dot densities from the data table stored in the memory. The CPU 3 counts the time simultaneously with the start instructions for the polygonal mirror motor. The count of the CPU 3 and the value loaded in the register are compared for each count, and when they are in accord, the CPU 3 instructs the start of the pre-rotation. When the rotation of the photosensitive member starts after a predetermined period from the start of the rotation of the rotational polygonal mirror, the print instruction is possibly produced during the polygonal mirror continues to rotate by inertia. If it occurs, the time is lost by the amount corresponding to the idler rotation by the inertia.

Therefore, in terms of print start signal during the idler rotation, it is preferable to start rotation of the photosensitive member on the basis of the rotational speed of the mirror.

In this embodiment, the rotational speed of the motor is detected since the rotational polygonal mirror is integral with the shaft of the driving motor. However, the rotational speed of the mirror may be directly detected by a light sensor or the like.

In the foregoing embodiments, a polygonal mirror has been taken as an example of the means for deflecting the light beam. However, the present invention is applicable to the means such as hologram which rotates in one direction or to a galvano mirror which reciprocally rotates, or the like, if it functions to deflect a light beam using a rotational motion.

While the invention has been described with reference to the structures disclosed herein, it is not confined to the details set forth and this application is intended to cover such modifications or changes as may come within the purposes of the improvements or the scope of the following claims.

What is claimed is:

1. A laser beam printer, comprising:
    laser beam producing means for producing a laser beam modulated in accordance with image information;
    deflecting means for deflecting the laser beam produced by said laser beam producing means to effect a scanning operation, said deflecting means is rotatable to deflect the laser beam;
    a rotatable photosensitive member for being exposed to the laser beam deflected by said deflecting means;
    control means for controlling said deflecting means and for controlling rotation of said photosensitive member; and
    wherein upon printing signal, said control means causes said deflecting means to start its rotation, and thereafter, causes said photosensitive member to start its rotation.

2. A printer according to claim 1, wherein said deflecting means reaches a constant speed rotation during a pre-rotation period of said photosensitive member.

3. A printer according to claim 1, said photosensitive member starts its rotation when the rotational of said deflecting means is smaller than a predetermined speed thereof predetermined for its rotation during its laser beam deflecting operation.

4. A printer according to claim 1, a cleaning blade for removing residual toner from said photosensitive member is contacted to said photosensitive member.

5. A printer according to claim 1, wherein said deflecting means rotates in one direction to deflect the laser beam.

6. A laser beam printer, comprising:
    laser beam producing means for producing a laser beam modulated in accordance with image information;
    deflecting means for deflecting the laser beam produced by said laser beam producing means to effect a scanning operation, said deflecting means is rotatable to deflect the laser beam;
    a rotatable photosensitive member for being exposed to the laser beam deflected by said deflecting means;
    control means for controlling said deflecting means and for controlling rotation of said photosensitive member; and
    wherein said control means starts rotation of said photosensitive member in accordance with a rotational speed of said deflecting means.

7. A printer according to claim 6, further comprising means for detecting the rotational speed of said deflecting means, wherein said control means causes said photosensitive member to start its rotation when said detecting means detects that said deflecting means reaches a predetermined rotational speed.

8. A printer according to claim 7, wherein said predetermined rotational speed is smaller than a rotational speed at the time of deflecting the laser beam.

9. A printer according to claim 6, wherein said deflecting means reaches a constant speed rotation during a pre-rotation period of said photosensitive member.

10. A printer according to claim 6, a cleaning blade for removing residual toner from said photosensitive member is contacted to said photosensitive member.

11. A printer according to claim 7, wherein a plurality of the predetermined rotational speeds are stored, from which one is selected in accordance with a dot density of said printer.

12. A printer according to claim 6, wherein said deflecting means rotates in one direction to deflect the laser beam.

13. A laser beam printer, comprising:
    laser beam producing means for producing a laser beam modulated in accordance with image information;
    deflecting means for deflecting the laser beam produced by said laser beam producing means to effect a scanning operation, said deflecting means is rotatable to deflect the laser beam;
    a rotatable photosensitive member for being exposed to the laser beam deflected by said deflecting means;
    control means for controlling said deflecting means and for controlling rotation of said photosensitive member; and
    wherein said control means causes said photosensitive member to start its rotation a predetermined period after start of the rotation of said deflecting means.

14. A printer according to claim 13, wherein said deflecting means reaches a constant speed rotation during a pre-rotation period of said photosensitive member.

15. A printer according to claim 13, wherein the predetermined period is shorter than a period from start of rotation of said deflecting means to reaching of a rotational speed of said deflecting means to a speed at the time of deflecting the laser beam.

16. A printer according to claim 13, a cleaning blade for removing residual toner from said photosensitive member is contacted to said photosensitive member.

17. A printer according to claim 13, wherein a plurality of the predetermined periods are stored, from which one is selected in accordance with a dot density of said printer.

18. A printer according to claim 13, wherein said deflecting means rotates in one direction to deflect the laser beam.

19. A laser beam printer, comprising:
    laser beam producing means for producing a laser beam modulated in accordance with image information;
    deflecting means for deflecting the laser beam produced by said laser beam producing means to effect a scanning operation, said deflecting means is rotatable to deflect the laser beam;
    a photosensitive member for being exposed to the laser beam deflected by said deflecting means;

control means for controlling rotation of said photosensitive member;

detecting means for detecting an acceleration of rotation of said deflecting means; and wherein said control means controls rotation start of said photosensitive member in accordance with detection by said detecting means.

20. A printer according to claim 19, wherein said control means causes said photosensitive member to start its rotation when said deflecting means reaches a predetermined rotational speed, and the predetermined rotational speed is changeable in accordance with the detection by said detecting means.

21. A printer according to claim 19, wherein said control means starts rotation of said photosensitive member after a predetermined period after start of rotation of said deflecting means, and said predetermined rotational speed is changed in accordance with the detection by said detecting means.

22. A printer according to claim 19, wherein the rotation start timing of said photosensitive member determined in accordance with the detection by said detecting means is stored in a memory, and upon printing operation, a datum is read from the memory to control the rotation start timing of said photosensitive member.

23. A printer according to claim 22, wherein the rotation start timing of said photosensitive member in accordance with the detection by said detecting means is determined at the time of a first printing operation after a main switch of said printer is closed.

24. A printer according to claim 19, wherein said deflecting means rotates in one direction to deflect the laser beam.

* * * * *

UNITED STATES PATENT AND TRADEMARK OFFICE
CERTIFICATE OF CORRECTION

PATENT NO. : 4,894,669
DATED : January 16, 1990
INVENTOR(S) : YOSHINORI SUGIURA, ET AL.

Page 1 of 2

It is certified that error appears in the above-identified patent and that said Letters Patent is hereby corrected as shown below:

SHEET 5 OF 5

FIG. 6, "LOARD" should read --LOAD-- (all occurrences).

COLUMN 1

Line 37, "pr-eprocess period" should read --pre-process period--.
    Line 48, "566" should read --5566--.

COLUMN 2

Line 1, "11,132, RPM" should read --11,132 RPM--.
    Line 22, "lead" should read --lead to--.
    Line 45, "vary." should read --varies.--.

COLUMN 4

Line 37, "is" should read --are--.
    Line 59, "operation," should read --operation),--.

COLUMN 5

Line 29, "frequently" should read --frequency--.
    Line 41, "300 DIP," should read --300 DPI,--.
    Line 46, "printer, upon" should read --printer. Upon--.

COLUMN 6

Line 61, "during" should read --while--.

UNITED STATES PATENT AND TRADEMARK OFFICE
CERTIFICATE OF CORRECTION

PATENT NO. : 4,894,669
DATED : January 16, 1990
INVENTOR(S) : YOSHINORI SUGIURA, ET AL.            Page 2 of 2

It is certified that error appears in the above-identified patent and that said Letters Patent is hereby corrected as shown below:

COLUMN 7

Line 41, "claim 1, said" should read --claim 1, wherein said--.
    Line 42, "rotational" should read --rotational speed--.
    Line 46, "claim 1, a" should read --claim 1, wherein a--.

COLUMN 8

Line 13, "claim 6, a" should read --claim 6, wherein a--.
    Line 49, "claim 13, a" should read --claim 13, wherein a--.

Signed and Sealed this

Eleventh Day of June, 1991

*Attest:*

HARRY F. MANBECK, JR.

*Attesting Officer*     *Commissioner of Patents and Trademarks*